(12) United States Patent
Ariga

(10) Patent No.: US 6,415,331 B1
(45) Date of Patent: Jul. 2, 2002

(54) METHOD OF UPDATING ACCUMULATED DATA WITH MIDDLEWARE AND SERVER SYSTEM PERFORMING THE SAME

(75) Inventor: Kenichi Ariga, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/296,105

(22) Filed: Apr. 22, 1999

(30) Foreign Application Priority Data

May 8, 1998 (JP) .......................................... 10-126095

(51) Int. Cl.$^7$ ........................ G06F 15/16; G06F 15/173
(52) U.S. Cl. ........................ 709/246; 709/238; 709/249
(58) Field of Search .............................. 709/246, 238, 709/249, 203, 242, 227, 217; 209/201; 370/401; 707/101, 201, 202, 512, 540

(56) References Cited

U.S. PATENT DOCUMENTS

| | | | | |
|---|---|---|---|---|
| 5,712,900 A | * | 1/1998 | Maupin et al. | 379/59 |
| 5,724,346 A | * | 3/1998 | Kobayashi et al. | 370/329 |
| 5,729,601 A | | 3/1998 | Murai | 379/269 |
| 5,774,668 A | * | 6/1998 | Choquir et al. | 709/223 |
| 5,813,016 A | * | 9/1998 | Sumimoto | 707/201 |
| 5,963,556 A | * | 10/1999 | Varghese et al. | 370/401 |
| 5,974,238 A | * | 10/1999 | Chase, Jr. | 707/200 |

FOREIGN PATENT DOCUMENTS

| | | |
|---|---|---|
| JP | 6-124255 | 5/1994 |
| JP | 7-38613 | 2/1995 |
| JP | 7-154413 | 6/1995 |
| JP | 7-225725 | 8/1995 |
| JP | 7-334474 | 12/1995 |
| JP | 8-163611 | 6/1996 |
| JP | 9-265438 | 10/1997 |

\* cited by examiner

Primary Examiner—Mehret B. Geckil
(74) Attorney, Agent, or Firm—Foley & Lardner

(57) ABSTRACT

A method of updating accumulated data with communication middleware and a server system capable of maintaining real-time characteristics for information and improving efficiency of a line is provided. Router side communication means and LAN side communication means perform control for communication on a LAN. Router side and LAN side buffer managing means perform management and notification for data transmitted and received on a radio network side and LAN side in a buffer. Communication continuing means executes processing for connection/reconnection to a client and acknowledgment for sending data packets as well as performing retransmission control and sequence control for application data when a line is disconnected. Also, communication continuing means determines whether data which has not been transmitted is new or old based on update information notified by data update monitoring means and prompts the client to update data. Data update monitoring means monitors data update information sent from an application server and notifies communication continuing means of the information.

14 Claims, 10 Drawing Sheets

FIG. 1
(PRIOR ART)
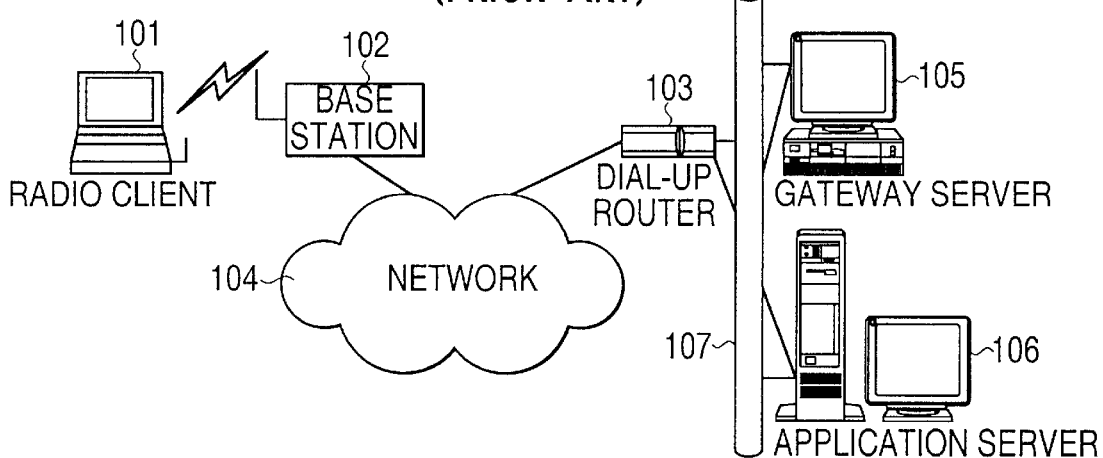
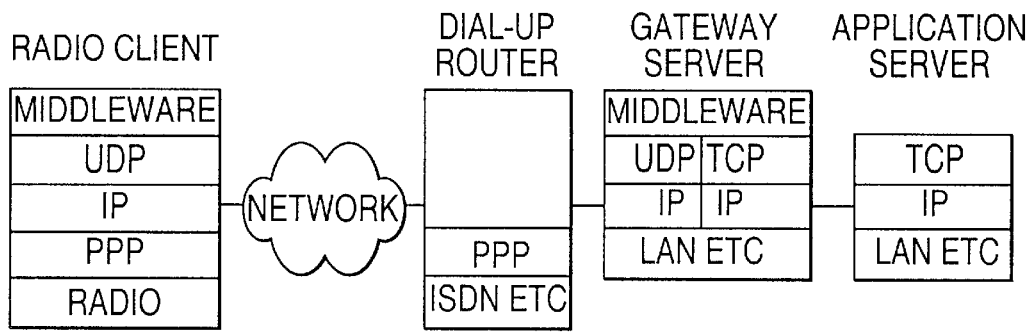

FIG. 8A
⊚ DATA PACKET
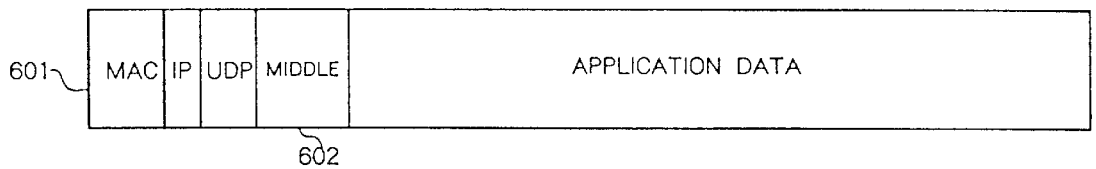
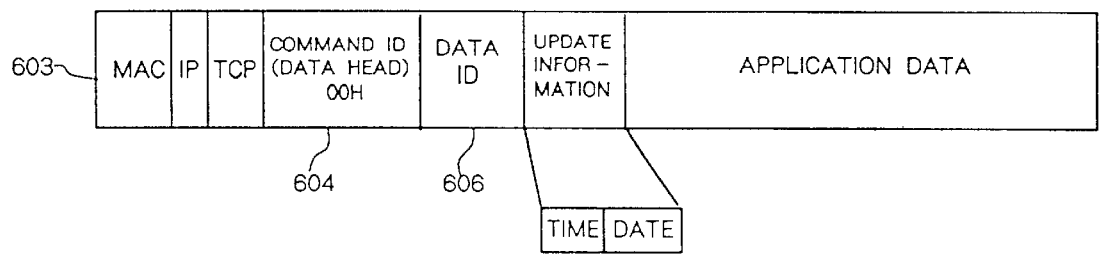
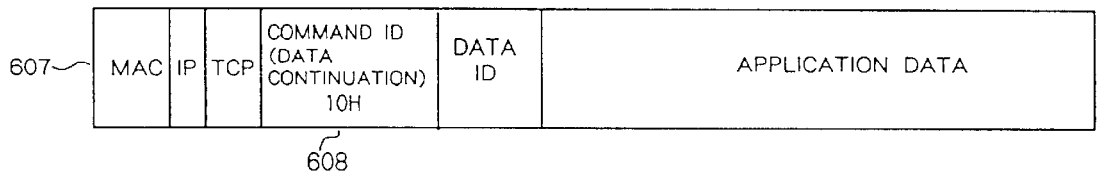
FIG. 8B
⊚ RECONNECTION PACKET
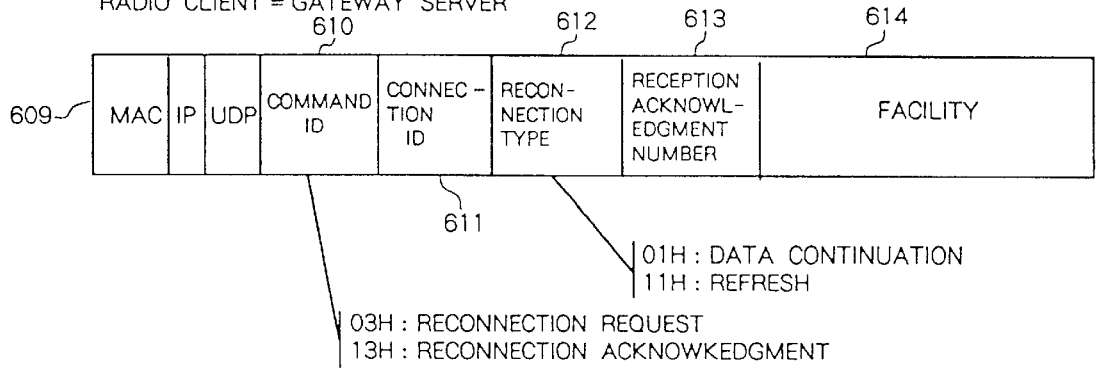

◎ DATA REQUEST PACKET

◎ UPDATE DATA NOTIFICATION PACKET

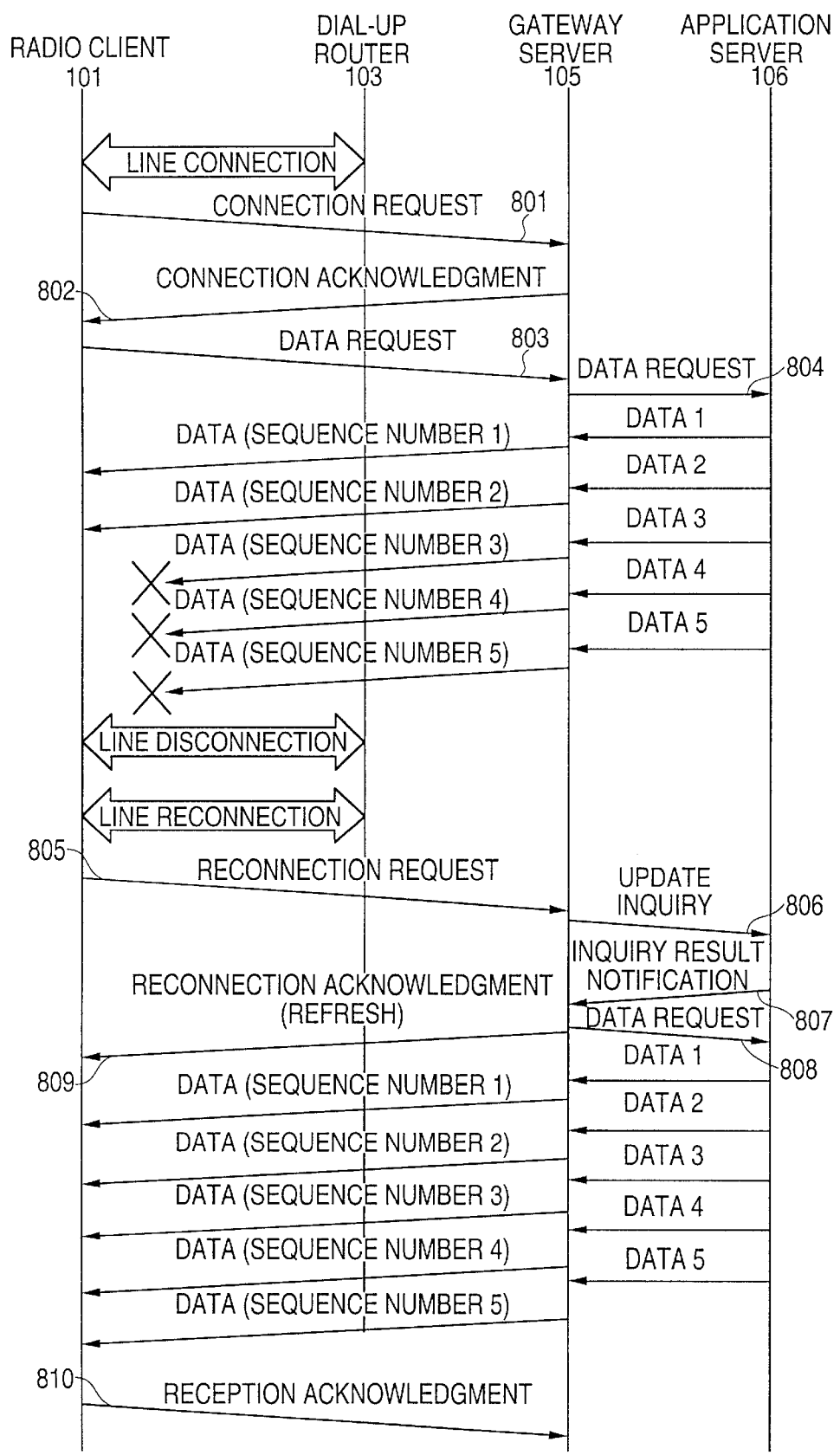

METHOD OF UPDATING ACCUMULATED DATA WITH MIDDLEWARE AND SERVER SYSTEM PERFORMING THE SAME

BACKGROUND OF THE INVENTION

1. Field of the Invention

The present invention relates to a server system used in a data communication system, more particularly, to a server system having update means for data which is held in a gateway server.

2. Description of the Related Art

In recent years, the use of a mobile communication system outdoors utilizing radio communication such as a PHS (Personal Handy Phone System) attracts attention of businessmen. However, a problem arises in that when radio data communication is performed, a poor quality of the communication often causes disconnection of a line. Although the disconnected line results only in a temporary interruption of sound in voice communication, it leads to loss of data in data communication.

In this case, retransmission control is generated, and the line is disconnected at the worst. In such a case, since all of application data become invalid, transmission and reception must be performed again from the beginning. This procedure for another transmission and reception can be performed several times depending on a communication state, thereby making a system very troublesome for a user to utilize.

For addressing this problem, recently, communication middleware is commercially available which enables, even if the line has been disconnected, transmission and reception to be restarted from a portion of data subsequent to a portion of the data previously received when the line is recovered after the disconnection. Description will be made on a system configuration and a communication sequence for prior art communication middleware with reference to FIG. 1 and FIG. 2. FIG. 1 is a schematic block diagram of a communication system provided with a gateway server having middleware and is used in common with description of the prior art and the present invention. FIG. 2 shows a communication sequence for the prior art communication system in FIG. 1.

As shown in FIG. 1, a typical communication system comprises radio client 101; radio base station 102 for connection to radio network 104; dial-up router 103 for connection to LAN 107; gateway server 105 implementing communication middleware; application server 106 realizing electronic mail, World Wide Web, or the like; and LAN 107.

In FIG. 1, gateway server 105 and application server 106 independently exist on the same network. However, gateway server 105 and application server 106 do not necessarily exist on the same network and both of them may exist on the same hardware. Radio client 101 and dial-up router 103 are connected using a PPP (Point-to-point protocol) and the communication middleware exists on a TCP/IP or UDP/IP protocol.

Next, an operation will be described using FIG. 2. First, radio client 101 connects a line with dial-up router 103, and after the completion of the connection, provides connection request 1101 for a communication connection at a communication middleware level to gateway server 105 and receives connection acknowledgment 1102 for communication connection from gateway server 105. FIG. 2 shows a case where data is transmitted from application server 106 to radio client 101. First, radio client 101 provides application data request 1103, then application server 106 transmits data for which the request is provided in response to the request. Packets to be transmitted are given sequence numbers and an ACK packet can be used to check to which point data has been transmitted.

FIG. 2 shows a case where the line is disconnected after data packets with sequence number 3 or later become unable to be transmitted while being transmitted from the gateway server due to a reduced receiving level in a radio wave area or the like. After the line is disconnected, radio client 101 reconnects the line with dial-up router 103, and after the completion of the reconnection, transmits reconnection request 1104 for connection to gateway server 105. At this time, the sequence numbers of data packets received correctly by radio client 101 are also notified. Gateway server 105, after the completion of processing for reconnection, transmits acknowledgment message 1105 to radio client 101. Thereafter, gateway server 105 retransmits data from the data packet with sequence number 3 which has not been received by radio client 101 and receives reception acknowledgment 1106 from radio client 101 to terminate a sequence of operations.

In this case, if the communication middleware is not implemented, it is required to request data again from the server to transmit the data from the beginning after the connection is established.

However, the prior art communication middleware has the following disadvantages. The first disadvantage is that if a line is disconnected during the reception of data for which a real-time characteristics are important and later an attempt is made to restart communication with the middleware from some midpoint in the data, the latest data can not be transmitted. This is because in the prior art communication middleware the application data accumulated at the gateway server with the communication middleware comes to be out of the control of the application server. Even when data has been updated to the latest version at the application server, the old application data accumulated at the gateway server with the communication middleware for which transmission has stopped can not be updated to the latest version so that the gateway server must transmit the old data without updating. The latest data is not transmitted unless there is another data request from the radio client.

The prior art will be described using FIG. 1. Even when the data packets (data packets with sequence numbers 3 to 5 in this prior art) to be transmitted at the time the reconnection processing is executed after the disconnection of the line have been updated to the latest version in application server 106, the data packets already accumulated in gateway server 105 are not under control of the application so that these accumulated data packets can not be discarded to update to the latest version. Thus, when the latest data packets are required, they must be transmitted after the accumulated data packets are transmitted.

Therefor if information such as monitoring information and traffic information for which the real-time characteristics are required is not updated until after the data packets accumulated in the gateway server have been transmitted, causing a problem in providing real-time service.

SUMMARY OF THE INVENTION

It is an object of the present invention to provide a method of updating accumulated data with middleware and a server system for performing the same, which can maintain real-time characteristics for information and improve efficiency of a line. To achieve this, time information of a data packet waiting for retransmission is looked up and it is determined whether data in a higher layer is new or old by inquiring of an application server about whether it is the latest or not, thereby making is possible always to transmit the latest data to a client terminal when a line reconnection is generated.

A method of updating accumulated data with middleware according to the present invention is a method of updating accumulated data with middleware in a data communication system connecting a client and an application server through a gateway server having the middleware. A gateway server receives specified data from the application server in response to a data request from the client, holds the data in a buffer, adds a predetermined header to the data, and transmits the data to the client. When the client has not been able to receive all of the specified data, the client requests reconnection to the gateway server. The gateway server, receiving the reconnection request, retransmits the data held in the buffer to the client if the data under transmission has not been updated in the application server. While, the gateway server which received the reconnection request updates the data under transmission held in the buffer to the latest version if the data under transmission has been updated in the application server, notifies the client that the data has been updated, and transmits the updated data to the client. The client, receiving the notification of the update, deletes the received accumulated data, and accumulate the updated data newly received.

A method of checking the presence or absence of update of the data under transmission in the application server is performed as follows.

The gateway server stores time information recorded in data in a table when the gateway server receives the data from the application server. The application server checks periodically the presence or absence of update of application data transmitted to the gateway server, and if the data has been updated, notifies the gateway server of a data ID and update time of the updated data as an update data notification. The gateway server stores the update data notification in the table and checks the presence or absence of update of the data under transmission based on the data ID and the update time in the data update notification when the gateway server acknowledges the reconnection request from the client.

Alternatively, in this method, the gateway server may transmit to the application server an update inquiry for checking the presence or absence of update in data contents of the data transmitted to the client when the gateway server receives the reconnection request for connection from the client, and the application server may notify the gateway server of the presence or absence of update.

In another aspect, the gateway server starts a timer when it transmits the data to the client, requests the application server to transmit updated data after a predetermined time has elapsed, deletes the data under transmission in the buffer, updates contents thereof to the updated data, and restarts the timer. When the gateway server receives a reconnection request from the client, the gateway server checks whether the data has been updated, transmits a data update information to the client if the data has been updated, and transmits the updated data to the client.

In a further aspect, the client counts the number of times reconnection for data is performed in data ID units, and if a predetermined number of reconnection is performed for the data with the same data ID, the client requests the gateway server to update the data when it transmits the reconnection request the next time. The gateway server deletes the data which has not been transmitted in the buffer, requests data with the data ID from the application server, obtains the latest data from the application server, and transmit the data to the client.

The gateway server and the application server may be independently connected on a LAN, or may be implemented on a single hardware.

A server system for updating accumulated data with middleware in a data communication system connecting a client and an application server through a gateway server having the middleware. The server system comprises a gateway server and an application server. The gateway server includes router side communication means, LAN side communication means, route side buffer managing means, LAN side buffer managing means, communication continuing means, data update monitoring means, and a control unit. Additionally, a recording medium which has a control program recorded for controlling the system may be included.

The router side communication means and the LAN side communication means perform control for TCP/IP, UDP/IP communication on a LAN. The router side buffer managing means performs management and notification for data transmitted and received on a network side of the client in a buffer. The LAN side buffer managing means performs management and notification for data transmitted and received on the LAN side in the buffer. The communication continuing means executes processing for connection/reconnection to the radio client and acknowledgment for sending data packets as well as performing retransmission control and sequence control for application data when a line is disconnected. The data update monitoring means determines whether data which has not been transmitted is new or old based on update information transmitted from the application server. The control unit controls the system with a control program.

The gateway server system according to the present invention is characterized in that it implements communication middleware capable of continuing data communication when the line is reconnected and has means for inquiring of the application server about whether or not the data accumulated in the gateway server as data for which reception has not been acknowledged is the latest data and based thereon executes processing for updating the accumulated data.

The above and other object, features, and advantages of the present invention will become apparent from the following description based on the accompanying drawings which illustrate examples of preferred embodiments of the present invention.

BRIEF DESCRIPTION OF THE DRAWINGS

FIG. 1 is a schematic block diagram showing a communication system provided with a gateway server having middleware;

FIG. 8A is a schematic diagram of a data format in the first embodiment of the present invention and shows data packets;

FIG. 8B is a schematic diagram of a data format in the first embodiment of the present invention and shows a reconnection packet;

FIG. 10 illustrates a communication sequence for a communication system of a second embodiment of the present invention.

DETAILED DESCRIPTION OF THE PREFERRED EMBODIMENTS

Figure 2:
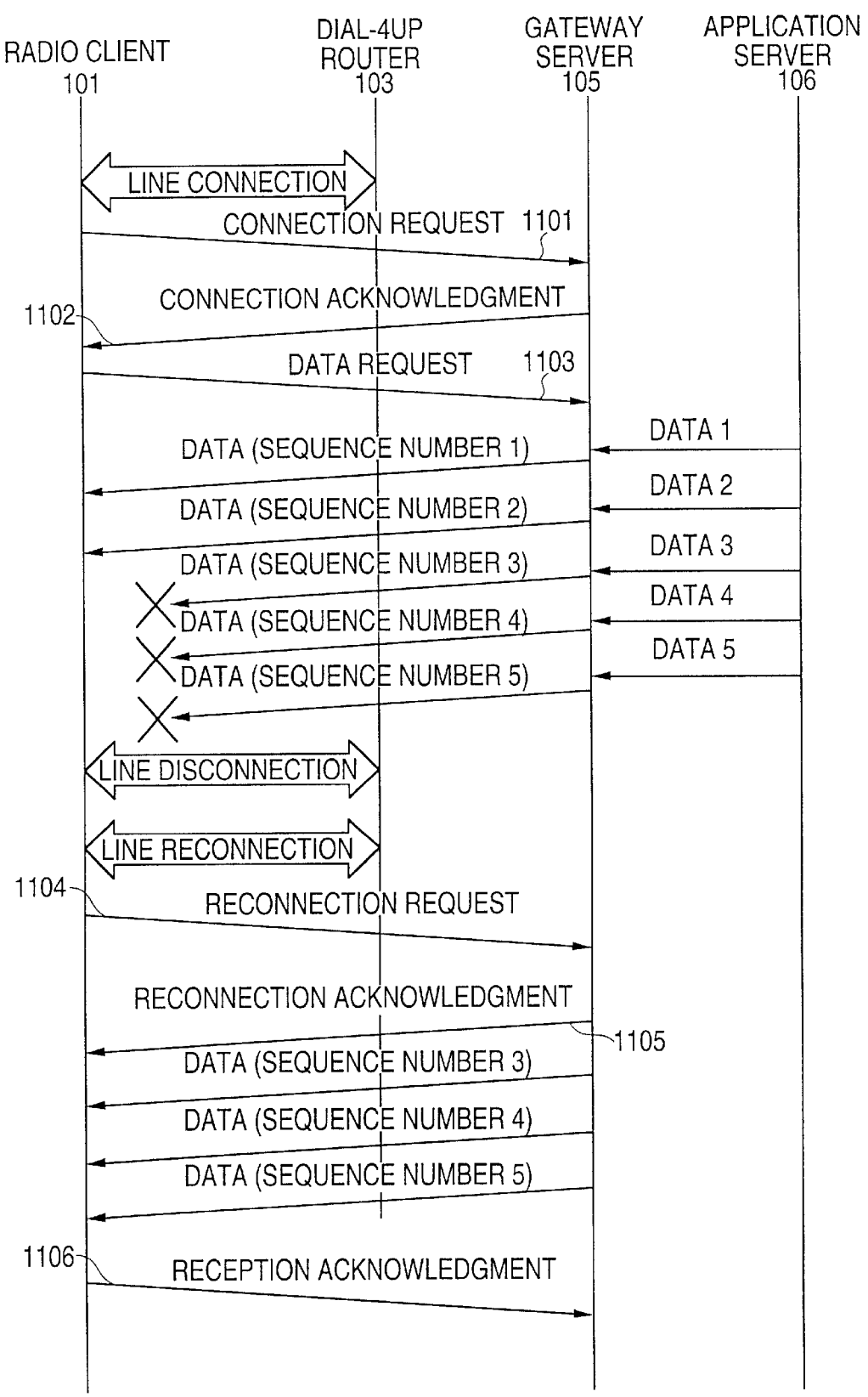
FIG. 2 illustrates a communication sequence for the communication system of a prior art in FIG. 1.
Figure 3:
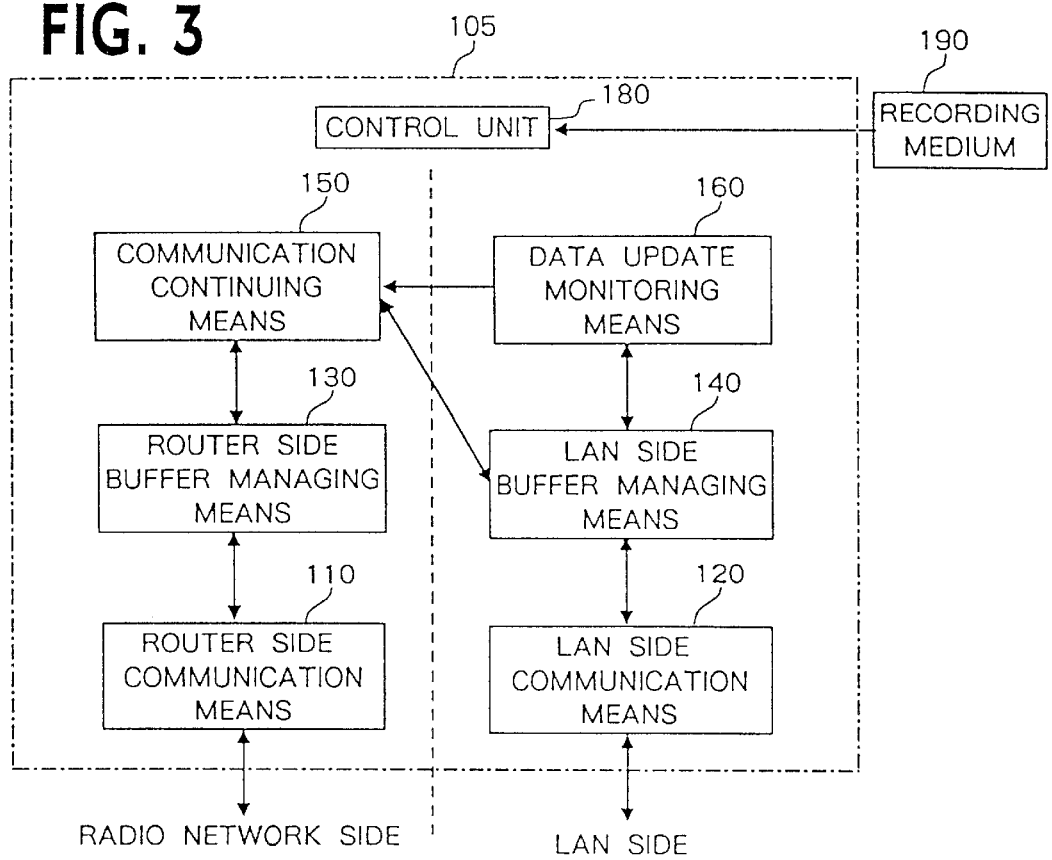
FIG. 3 is a schematic block diagram showing a function of a gateway server in a server system of a first embodiment of the present invention.

Next, embodiments of the present invention will be described with reference to the drawings. In FIG. 3, gateway server 105 comprises router side communication means 110, LAN side communication means 120, router side buffer managing means 130, LAN side buffer managing means 140, communication continuing means 150, data update monitoring means 160, and control unit 180. Also, gateway server 105 may include recording medium 190 which has a program recorded for controlling a system.

Gateway server 105 is divided into two by a center broken line in FIG. 3, i.e. processing on a radio network side and processing on an LAN side. Router side communication means 110 and LAN side communication means 120 perform control for TCP/IP, UDP/IP communication on a LAN such as an Ethernet. Router side buffer managing means 130 performs management and notification for data transmitted and received on the radio network side in a buffer. LAN side buffer managing means 140 performs management and notification for data transmitted and received on the LAN side in the buffer. Communication continuing means 150 executes processing for connection/reconnection to a radio client and acknowledgment for sending data packets as well as performing retransmission control and sequence control for application data when a line is disconnected. Also, communication continuing means 150 determines whether data for which transmission is not completed is new or old based on update information notified by data update monitoring means 160 and prompts the client to update data. Data update monitoring means 160 monitors data update information sent from an application server and notifies communication continuing means 150 of the information. Control unit 180 controls the system with the control program.

In a first embodiment of the present invention, the above-mentioned means can be used to always transmit the latest data to the client even when data has been updated in the application server. The reason is that data update monitoring means 160 sends the data update information notified by the application server to communication continuing means 150 which determines whether or not accumulated data has been updated, sends an instruction for requesting the latest data to the application server if the data has been updated, and notifies the obtained result to buffer managing means 130 which controls the buffer.

Figure 4:
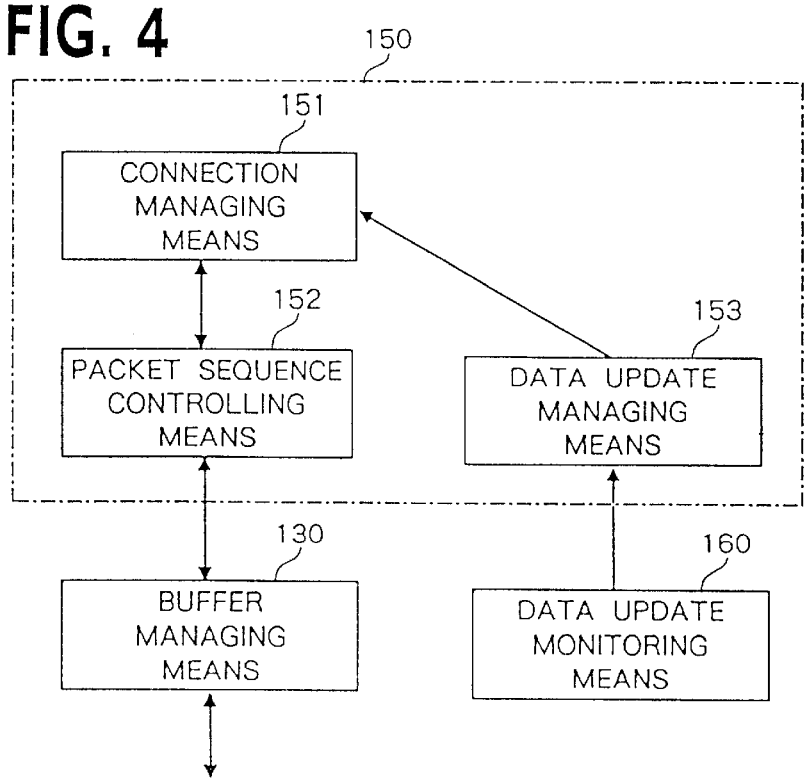
FIG. 4 is a schematic block diagram showing a function of communication continuing means of the gateway server in FIG. 3.

Referring to FIG. 4 showing a function of communication continuing means 150 of the gateway server, connection managing means 151 executes processing for connection and disconnection and reconnection with communication middleware. Packet sequence controlling means 152 performs management of sequence numbers in transmission and reception data packets and update and retransmission control for data. When data update managing means 153 recognizes that data has been updated based on an update data notification given by the application server, it requests the application serve to fetch the updated data, and notifies the result to packet sequence controlling means 152.

Next, the operation of this server system in the first embodiment of the present invention will be described using flow charts and a communication sequence diagram with reference to FIG. 5, FIG. 6, FIG. 7 and FIG. 1.

A configuration of the data communication system comprises radio client 101; radio base station 102 for connection to a radio network; dial-up router 103 for connection to LAN 107; gateway server 105 implementing communication middleware; and application server 106 realizing electronic mail, World Wide Web, or the like, similarly to the prior art system as shown in FIG. 1.

A packet data format for transmission and reception between gateway server 105 and application server 106 has a command ID header added after a MAC header of a LAN protocol and a TCP/IP protocol as shown in FIG. 8A, FIG. 8B, FIG. 9A and FIG. 9B. This command ID is used by respecting servers to identify a type of a data packet. Data accumulated in the application server have IDs each given for a certain amount, for example each data amount corresponding to a screenful of data. This data amount is herein referred to as a data ID unit.

Figure 5:
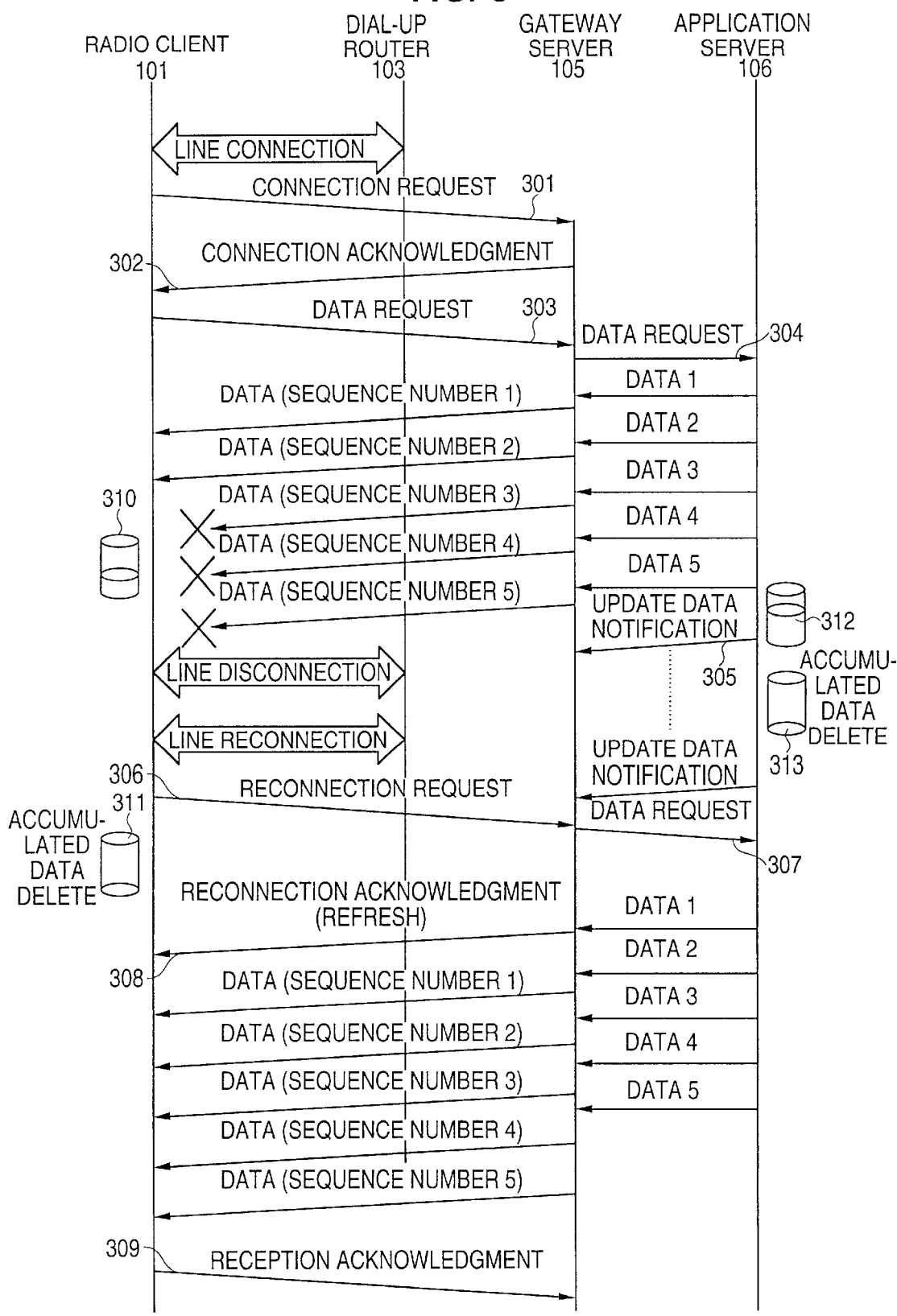
FIG. 5 illustrates a communication sequence for a communication system of the first embodiment of the present invention.

FIG. 5 illustrates a sequence in a state in which the radio clients become unable to receive data packets due to a reduced strength of a receiving electric field while receiving data from the application server, and after a short time, the line is disconnected.

In FIG. 5, reference numerals 310 and 311 show accumulation states of a buffer in radio client 101, and reference numerals 312 and 313 show accumulation states of a buffer in gateway serve 105 at respective points on the sequence.

Figure 6:
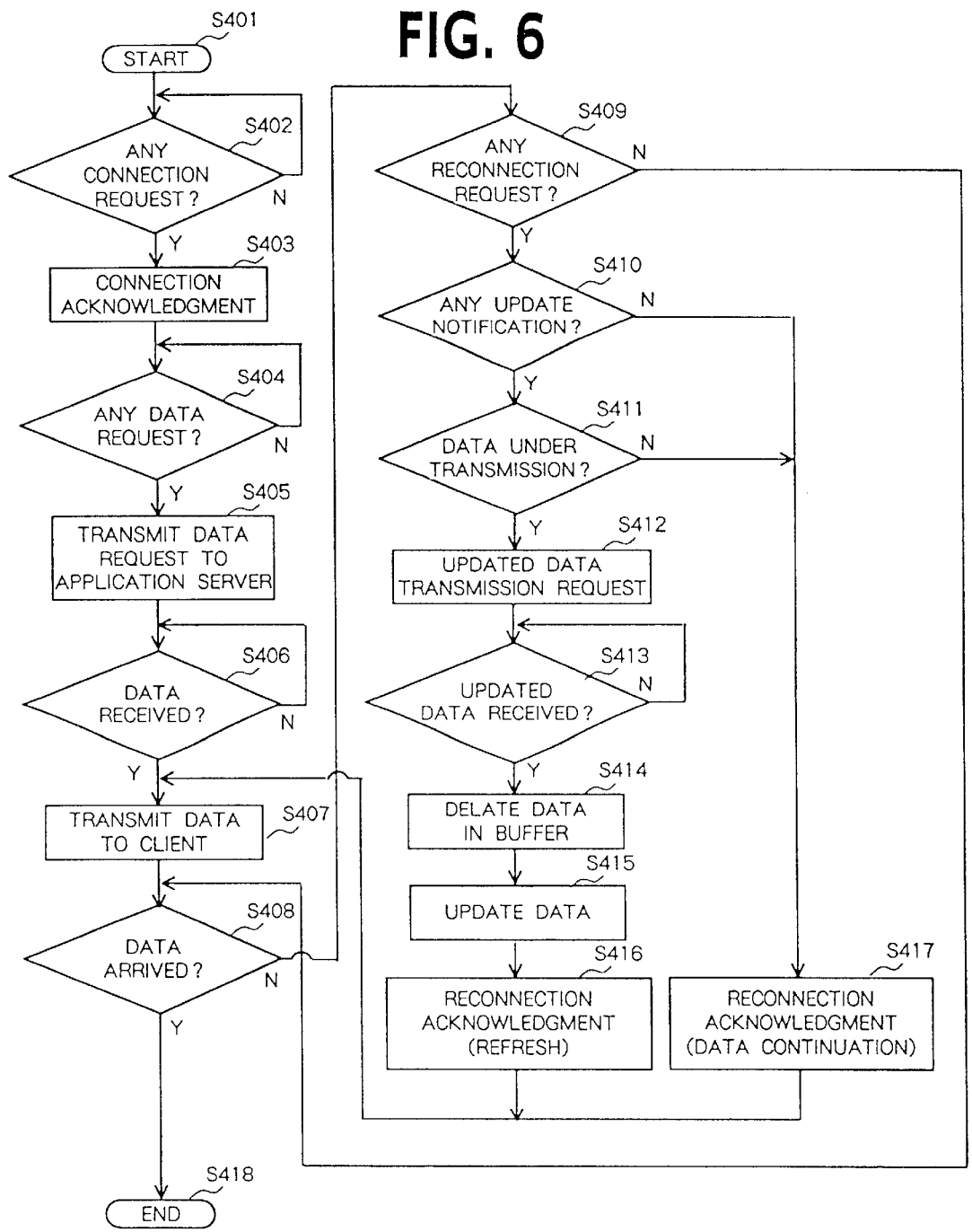
FIG. 6 is a flow chart illustrating a data transmission operation of the gateway server of the first embodiment of the present invention.

Next, an operation will be described based on a flow chart for the gateway server in FIG. 6. When the operation is started (S401), gateway server 105 waits for connection request 301 from radio client 101 (S402N). Radio client 101 then performs line connection with dial-up router 103, and after the completion of the connection, transmits connection request 301 to gateway server 105 (S402Y). Gateway server 105, upon recognizing the connection of the radio client, transmits connection acknowledgment 302 to radio client 101 (S403).

Gateway server 105 waits for data request (S404N). Radio client 101, upon completing the connection, transmits data request 303 to gateway server 105 (S404N). Gateway server 105 converts the format of the received data to provide data request 304 in a packet format shown as 701 in FIG. 9A which is transmitted to application server 106 (S405) and waits for data reception (S406N).

Application server 106, in response to this request, starts transmitting data specified by the data request packet to gateway server 105 (S406Y).

As shown in packet formats with reference numerals 603 and 607 in FIG. 8A, the data transmitted from application server 106 are of two kinds, i.e. packet 603 indicating the head of a data ID unit and continuation packet 607 indicating some midpoint in data, in which head packet 603 has time information 606 added thereto indicating update time of data in the data ID units. Application server 106 performs transmission and reception to and from gateway server 105 using the TCP/IP.

Gateway serve 105, upon receiving the data, stores time information 606 in a table and then adds header 602 including a sequences number, a connection ID and so on for communication middleware control to provide data in the form of packet format 601 in FIG. 8A which is transmitted to radio client 101 through the UDP/IP (S407).

When the communication is normal, radio client 101 acknowledges the reception of all of the data to transmit reception acknowledgment notification 309 to gateway server (S408Y), and gateway server 105 terminates a sequence of operations.

Next, description will be made for a case where an abnormal condition occurs in the communication. Assuming that when radio client 101 has just received data up to sequence number 2, it moves to a place where a radio wave condition is deteriorated so that a reduced strength of a receiving electric field makes it impossible to receive data with sequence numbers 3 to 5, resulting in disconnection of the line. Since reception acknowledgment notification 309 does not arrive from radio client 101 (S408N), gateway server 105 checks whether or not a reconnection request is present. If no reconnection request is present (S409N), gateway server 105 returns to step S408 of checking the reception acknowledgment notification.

Radio client 101 attempts to connect the line with dial-up router 103 for reconnection. Upon success of the line connection, radio client 101 transmits reconnection request 306 to gateway server 105. Upon acknowledging reconnection request 306 (S409Y), gateway server 105 asks data update managing means 153 whether or not the data update notification from application server 106 is present (S410).

If data update notification 305 from application server 106 is present (S410Y) and the updated data is the data under transmission to radio client 101 (S411Y), gateway server 105 transmits request 307 for transmitting the updated data to application server 101 (S412) and waits for the arrival of the updated data (S413N). When the updated data arrives (S413Y), gateway server 105 deletes the data under transmission to radio client 101 in buffer 312 (S414), updates the content to the updated data (S415), transmits connection re-acknowledgment (refresh) 308 to radio client 101 (S416), and returns to step S407 to transmit the updated data in the buffer to radio client 101. Radio client 101, upon receiving the message of connection re-acknowledgment (refresh) 308, deletes accumulated data in buffer 310 to receive the new data.

If no update notification is present (S410N) or data for which the update notification is issued is not the data under transmission (S411N), gateway server 105 transmits connection re-acknowledgment (data continuation) to radio client 101 (S417) and returns to S407 to retransmit the data packets which have not been transmitted and are accumulated therein as they are to radio client 101. In this case, data which have been not transmitted having sequence numbers indicated by reconnection request 306 from radio client 101 are transmitted.

If no data have been updated, the messages of reconnection request 306 and reconnection acknowledgment 308 conform to data formats shown as 609 in FIG. 8B. Command ID 610 is used to identify the request or acknowledgment. Reconnecting type 612 is used to identify data continuation or refresh.

Now, a procedure for updating data in application server 106 and gateway server 105 will be described in detail. Application server 106 checks inside whether data transmitted from itself has been newly updated, and notifies the result at regular intervals in the data ID units to gateway server 105 as update data notification 305. Update data notification 305 has a format shown as 702 in FIG. 9B in which a combination of the updated data ID and update information including time and date is notified as a list form. The data update information is issued only for the data transmitted to gateway server 105 by application server 106. Gateway server 105, upon receiving reconnection request 306 from radio client 101, compares update information 606 containing time and date included in the head packet within data packets having data IDs which have not been transmitted to radio client 101 and remain in gateway server 105 with the data ID and a list of the update information indicated by update data notification 305 received at regular intervals from application server 106. If a updated data ID is present, gateway server 105 deletes the data associated with the data ID from the buffer and then transmits data request 307 to application server 106, thereby fetching only the updated data ID.

Figure 9A:
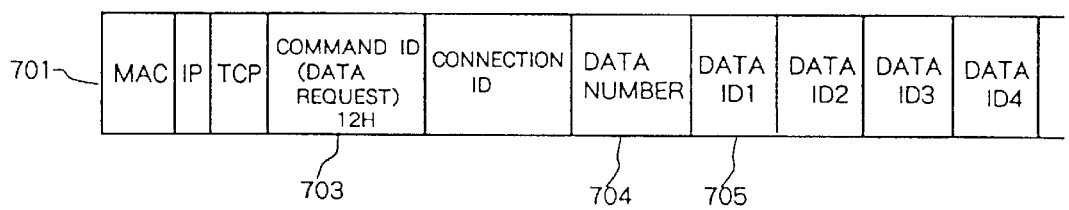
FIG. 9A is a schematic diagram of a data format in the first embodiment of the present invention and shows a data request packet.
Figure 9B:
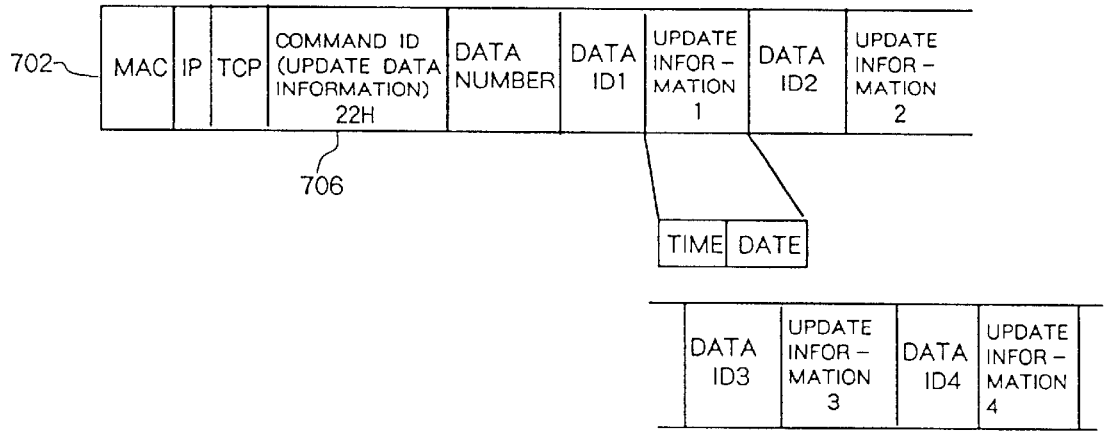
FIG. 9B is a schematic diagram of a data format in the first embodiment of the present invention and shows an update data notification packet.

Data request 307 has a data format shown as 701 in FIG. 9A in which a list of data required is transmitted. Since the data update in gateway server 105 is performed in the data ID units, data are fetched from the head packet in the data ID. FIG. 5 shows an example when updated data is present.

Figure 7:
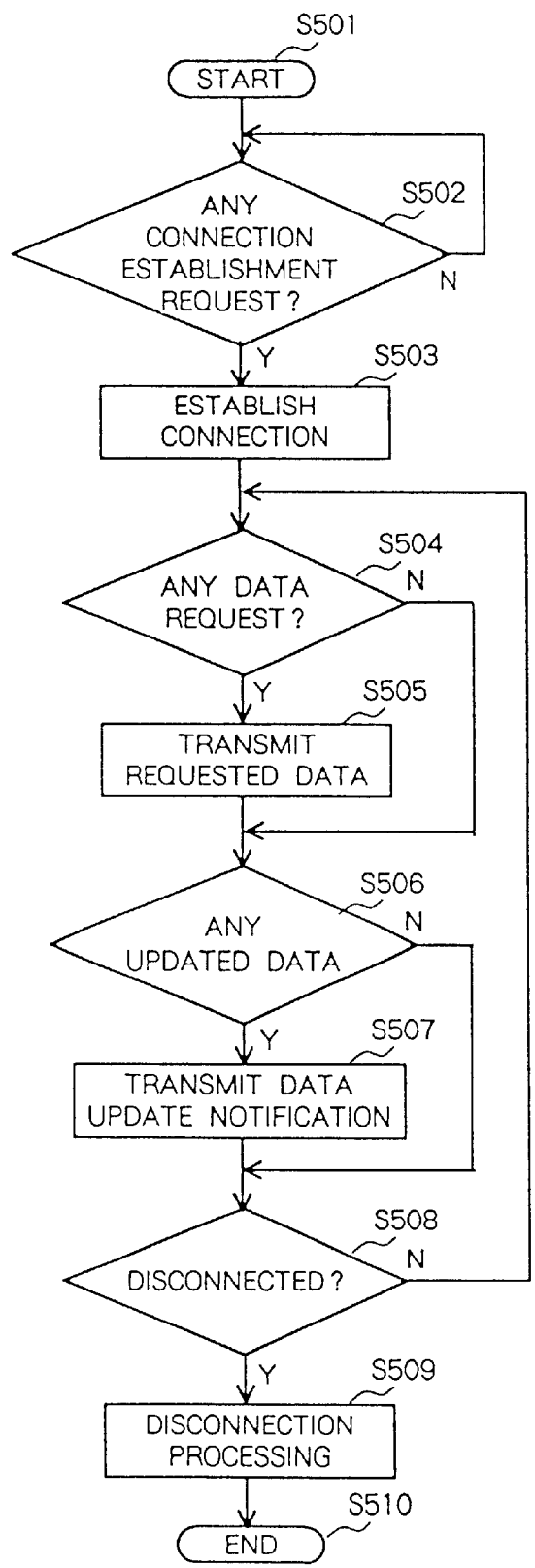
FIG. 7 is a flow chart illustrating a data transmission operation of an application server of the first embodiment of the present invention.

Next, an operation for transmitting data by application server 106 will be described using FIG. 7. Upon starting the operation (S501), application server 106 waits for a connection request from gateway server 105 (S502N). When the connection request is received (S502Y), application server 106 establishes connection (S503), and checks the presence or absence of the reception of data request 304 from gateway server 105 (S504). If data request 304 is present (S504Y), application server 106 transmits data with data IDs requested (S505), and proceeds to step S506. If no data request 304 is present (S504N), application server 106 also proceeds to step S506.

Next, it is checked whether or not updated application data are present. If any updated data are present (S506Y), application server 106 notifies gateway server 105 of the ID of the updated data with update data notification 305 (S507) and proceeds to step S508. If no updated data are present (S506N), application server 106 also proceeds to step S508.

Application server 106 then checks whether or not the connection is disconnected. If the connection is not disconnected (S508N), application data 106 returns to step 504 and checks again the reception of the data request. If the disconnection request is issued (S508Y), the connection is disconnected (S509) and the operation is terminated (S510).

Next, description will be made of a recording medium which has the control program recorded for the server system of the present invention. As shown in FIG. 3, the control program for gateway server 105 is read from recording medium 190 to a data processing section (not shown) of control unit 180 and controls the operation of the data processing section. Control unit 180 executes the following processing under control of the control program:

processing of receiving connection request 301 from radio client 101 and transmitting connection acknowledgment 302 to radio client 101 upon acknowledging the connection;

processing of, upon receiving data request 303 from radio client 101, converting the received data format to provide data request 304, and transmitting data request 304 to application server 106;

processing of, upon receiving data from application server 106, storing time information thereof in the table and then adding thereto header 602 for communication middleware control including a sequence number, a connection ID and so on, and transmitting the data to radio client 101;

when the reception acknowledgment notification from radio client 101 does not arrive, processing of checking whether or not the data update notification is received from application server 106 upon acknowledging reconnection request 306, and if the data update notification is received and the updated data are the data under transmission to radio client 101, requesting application server 106 to transmit the updated data, deleting the data under transmission to radio client 101 in the buffer to update the content to the updated data, transmitting connection re-acknowledgment (refresh) 308 to radio client 101, and transmitting the updated data to radio client 101; and when no update notification is received or the data for which the update notification is issued are not the data under transmission, processing of transmitting connection re-acknowledgment (data continuing) to radio client 101, and retransmitting the data packets accumulated in gateway server 105 which have not been transmitted as they are to radio client 101.

Next, a second embodiment of the present invention will be described with reference to FIG. 10. In the first embodiment, application server 106 checks inside whether or not the data transmitted from itself has been newly updated and notifies the resultant information at regular intervals to gateway server 105 as update data notification 305 in the data ID units. In the second embodiment, however, application server 106 does not check whether or not the data transmitted from itself has been newly updated, and thus does not issue update data notification 305. Application server 106 issues an inquiry result report about whether or not update has been performed when an update inquiry from gateway server 105 is received, and transmits updated data when a data request from gateway server 105 is received.

FIG. 10 shows a sequence in a state in which radio client 101 becomes unable to receive packets due to a reduced strength of a receiving electric field while receiving data from application server 105, and after a short time, a line is disconnected.

First, radio client 101 connects the line with dial-up router 102, and after the completion of the connection, transmits connection request 801 to gateway server 105. Gateway server 105, upon recognizing the connection of radio client 101, transmits connection acknowledgment 802 to radio client 101. When the connection is established, radio client 101 transmits data request 803 to gateway server 105. Gateway server 105 converts a data format thereof to provide data request 804 and transmits data request 804 to application server 106. In response to this request, application server 106 starts transmitting data specified by a data request packet. Assuming that when radio client 101 has just received up to data with sequence number 2, it moves to a place where a radio wave condition is deteriorated, so that a reduced strength of a receiving electric field makes it impossible to receive data with sequence numbers 3 to 5 and the line is disconnected.

Radio client 101 attempts to connect the line with dial-up router 103 for reconnection. After success of the line connection, radio client 101 transmits reconnection request 805 to gateway server 105. Gateway server, receiving reconnection request 805, transmits update inquiry packet 806 to application server 106 to inquire whether or not any data ID of data packets under transmission to radio client 101 has been updated in application server 106. Application server 106 transmits the resultant information on the presence or absence of the update which is included in inquiry result notification packet 807 to gateway server 105.

Gateway server 105 checks whether or not any information has been updated in data packets already transmitted to radio client 101. If any update is present, gateway server 105 transmits data request packet 808 to application server 106 in data ID units to fetch data. Simultaneously, gateway server 105 transmits reconnection acknowledgment (refresh) 809 to radio client 101. Radio client 101, upon receiving this message, deletes accumulated data to receive new data.

When no updated data is present in application server 106, reconnection acknowledgment (data continuing) is transmitted to radio client 101 after the reconnection, and data packets accumulated in gateway server 105 which have not been transmitted are retransmitted as they are.

Next, a third embodiment of the present invention will be described. In the first embodiment, application server 106 checks inside whether or not the data transmitted from itself has been newly updated and issues the update data notification at regular intervals. In the second embodiment, application server 106 issues the inquiry result report on the presence or absence of update when gateway server 106 inquiries about update, and transmits the updated data when gateway server 105 issues the data request. The third embodiment limits time for gateway server 105 to hold data which has not been transmitted, in which data is forcedly updated when the holding time thereof exceeds the limit.

Figure 11:
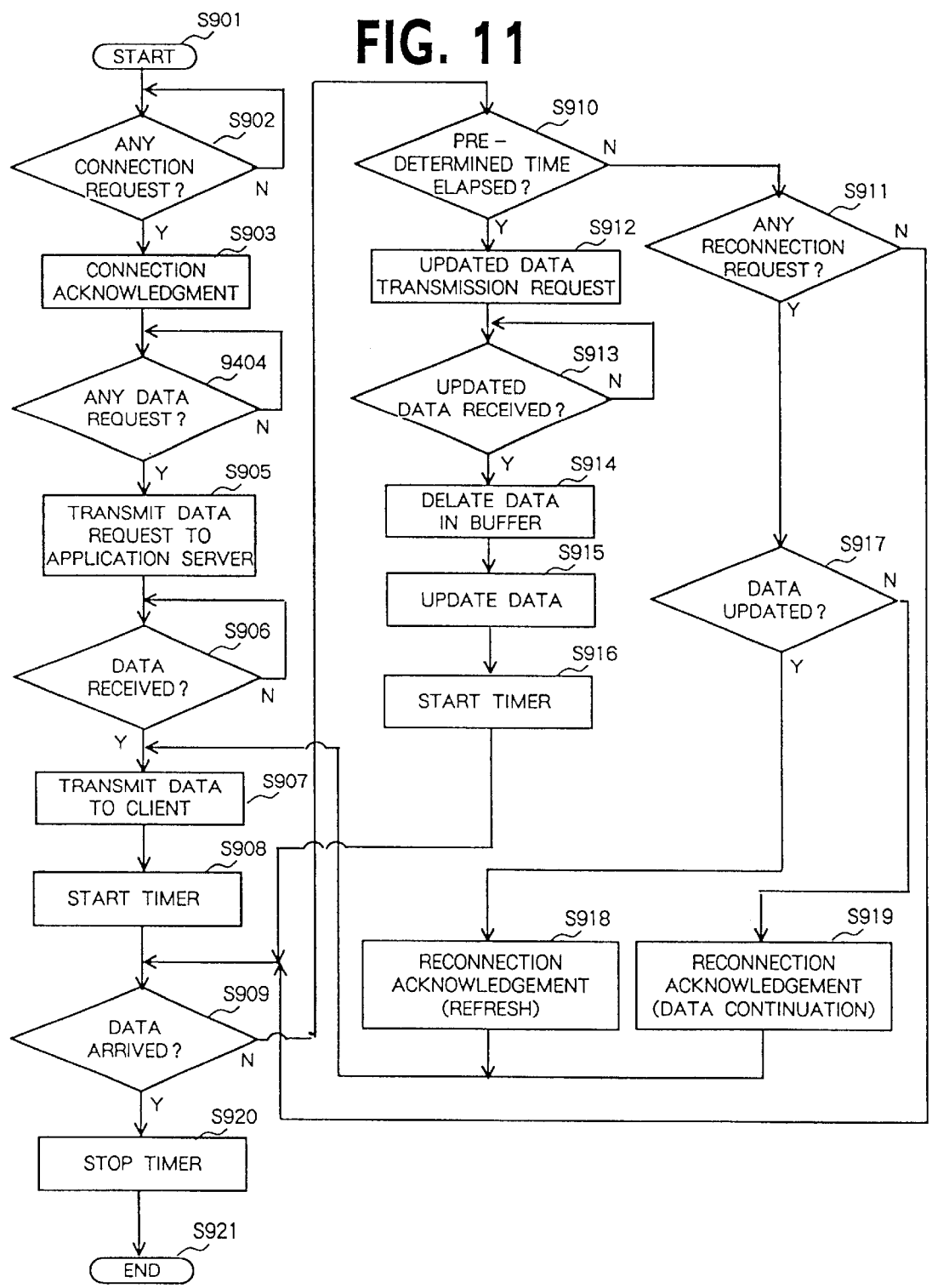
FIG. 11 is a flow chart illustrating a data transmission operation of a gateway server of a third embodiment of the present invention.

The third embodiment will be described with reference to FIG. 5 which was used for the description of the first embodiment and FIG. 11.

Since steps S901 to S907 before the data transmission are the same as those of the first embodiment, description thereof is omitted. In the third embodiment, gateway server 105, upon transmitting data to radio client 101 (S907), starts a timer (S908). When gateway server 105 receives reception acknowledgment notification 309 from radio client 101 (S909Y), it stops the timer (S920) to terminate a sequence of operations (S921).

When a line is disconnected during the reception of data by radio client 101, gateway server 105 does not receive reception acknowledgment notification 309 (S909N) so that it monitors a lapse of a predetermined time in the timer (S910). When the elapsed time is below the predetermined time (S910N) and no reconnection request is present (S911N), gateway server 105 returns to step S909 to wait for the reception of the reception acknowledgment notification, the lapse of the predetermined time in the timer, and the reconnection request.

When the predetermined time has elapsed (S910Y), gateway server 105 requests application server 106 to transmit updated data (S912) to wait for the arrival of the updated data (S913N). When the updated data arrives (S913Y), gateway server 105 deletes data under transmission to radio client 101 in a buffer (S914) to update its content to the updated data (S915), then restarts the timer (S916), and returns to step 909 to wait for the reception of the reception acknowledgment notification, the lapse of the predetermined time in the timer, and the reconnection request.

When the reconnection request is received from radio client (S911Y), gateway server 105 checks whether or not any data have been updated (S917). If any data has been updated (S917Y), gateway server 105 transmits connection re-acknowledgment (refresh) 308 to radio client 101 (S918) and returns to step 907 to transmit the updated data to radio client 101. On the other hand, when no data have been updated (S917N), gateway server 105 transmits connection re-acknowledgment (data continuing) to radio client 101 (S919) and returns to step 907 to transmit the data held in the buffer to radio client 101.

Next, a fourth embodiment will be described. In the fourth embodiment, unlike the first to third embodiments, an application of radio client 101 transmits a data update request to gateway server 105 after radio client 101 establishes reconnection with gateway server 105. Radio client 101 counts the number of times reconnection for data is performed in data ID units. When a predetermined number of reconnection is performed for the same data ID at data transmission and reception, radio client 101 requests gateway server 105 to update the data when it transmits a reconnection request the next time. In response to this, gateway server 105 deletes data which have not been transmitted and then requests data with the data ID to application server 106 to obtain the latest data which is transmitted to radio client 101.

In a fifth embodiment of the present invention, gateway server 105 and application server 106 are implemented in a single hardware. In this case, a communication procedure between gateway server 105 and application server 106 as shown in FIG. 5 is eliminated and processing is performed in the single hardware.

The foregoing description of the embodiments has been made by taking as an example the data communication system with the radio client in which a line impairment easily occurs during communication. However, the server system of the present invention is not limited to the data communication with the radio client.

As described above, the present invention can provide effects as described in the following. Specifically, a first effect is that the application server of the present invention has means for notifying the gateway server of the update information for the data already transmitted to the gateway server to thereby enable the gateway server to determine whether or not the data packets which have not been transmitted to the client are old data, yielding a result that new data can be always transmitted to the client.

A second effect is that the gateway server notifies the radio client of information about the presence or absence of the update of the retransmitted data when the line is reconnected, so that the radio client can delete the accumulated data to fetch new data when any update is present.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A method of updating accumulated data at a client with middleware in a data communication system connecting said client and an application server through a gateway server having said middleware, said method comprising the steps of:

at said gateway server:
receiving specified data from said application server in response to a data request from said client;
holding the specified data in a buffer;
adding a predetermined header to the specified data; and
transmitting the specified data held in the buffer to said client if the specified data under transmission has not been updated in said application server when a reconnection request is received from said client; while
updating the specified data under transmission held in the buffer to the latest version if the specified data has been updated in said application server when the reconnection request is received from said client;
notifying said client that the specified data has been updated as updated data; and
transmitting the updated data to said client;

at said client:
requesting the specified data to said gateway server;
requesting reconnection to said gateway server when all of the specified data have not been received;
deleting the received accumulated data when receiving the notification of the update from said gateway server; and
accumulating the updated data newly received from said gateway server.

2. The method of updating accumulated data at a client in a data communication system according to claim 1, wherein said application server determines whether or not the specified data has been updated by performing the steps of:

storing time information recorded in data in a table when said gateway server receives the specified data from said application server;
checking periodically the presence or absence of update of the specified data transmitted to said gateway server by said application server, and if the specified data has been updated, notifying said gateway server of a data ID and update time of the updated data as an update data notification; and
storing the update data notification in the table by said gateway server and checking the presence or absence of the specified data under transmission based on the data ID and the update time in the data update notification when said gateway server acknowledges the reconnection request from said client.

3. The method of updating accumulated data at a client in a data communication system according to claim 1, wherein said application server determines whether or not the specified data has been updated by performing the steps of:

transmitting to said application server an update inquiry for checking the presence or absence of update in data contents of the specified data transmitted to said client when said gateway server received the reconnection request from said client; and
notifying to said gateway server of the presence or absence of update by said application server.

4. The method of updating accumulated data at a client with middleware according to claim 1, wherein said gateway server and said application server are independently connected on a LAN.

5. The method of updating accumulated data at a client with middleware according to claim 1, wherein said gateway server and said application server are implemented on a single hardware.

6. A method of updating accumulated data at a client with middleware in a data communication system connecting said client and an application server through a gateway server having said middleware, said method comprising the steps of:

at said gateway server:
receiving specified data from said application server in response to a data request from said client;

holding the specified data in a buffer;
adding a predetermined header to the specified data; and
transmitting the specified data to said client;
starting a timer when transmitted the specified data to said client;
requesting said application server to transmit updated data after a predetermined time has elapsed;
deleting the specified data in the buffer;
updating contents thereof to the updated data; and
restarting the timer;
receiving the reconnection request from said client;
checking whether the specified data has been updated;
retransmitting the specified data held in the buffer to said client if the specified data has not been updated; while
transmitting a data update information to said client if the specified data has been updated; and
transmitting the updated data to said client;
at said client:
requesting the specified data to said gateway server;
requesting reconnection to said gateway server when all of the specified data have not been received;
receiving the notification of the update from said gateway server;
deleting the received accumulated data; and
accumulating the updated data newly received from said gateway server.

7. The method of updating accumulated data at a client with middleware according to claim 6, wherein said gateway server and said application server are independently connected on a LAN.

8. The method of updating accumulated data at a client with middleware according to claim 6, wherein said gateway server and said application server are implemented on a single hardware.

9. A method of updating accumulated data at a client with middleware in a data communication system connecting said client and an application server through a gateway server having said middleware, said method comprising the steps of:
at said gateway server:
receiving specified data from said application server in response to a data request from said client;
holding the specified data in a buffer;
adding a predetermined header to the specified data; and
transmitting the specified data to said client;
retransmitting the specified data held in the buffer to said client when a reconnection request is received from said client;
deleting the specified data which has not been transmitted in the buffer when a data update request is received from said client;
requesting the specified data with a data ID to said application server;
obtaining the latest data from said application server; and
transmitting the latest data to said client;
at said client:
requesting the specified data to said gateway server;
requesting reconnection to said gateway server when all of the specified data have not been received;
counting the number of times reconnection for data is performed in data ID units; and
requesting said gateway server to update the specified data when transmits the reconnection request at a next time after a predetermined number of reconnections is performed for the same data ID.

10. The method of updating accumulated data at a client with middleware according to claim 9, wherein said gateway server and said application server are independently connected on a LAN.

11. The method of updating accumulated data at a client with middleware according to claim 9, wherein said gateway server and said application server are implemented on a single hardware.

12. A server system for updating accumulated data at a client with middleware in a data communication system connecting the client and an application server through a gateway server having the middleware, wherein:
said gateway server including router side communication means, LAN side communication means, router side buffer managing means, LAN side buffer managing means, communication continuing means, data update monitoring means, and a control unit;
the router side communication means and the LAN side communication means performing control for TCP/IP, UDP/IP communication on a LAN;
the router side buffer managing means performing management and notification for data transmitted and received on a network side of said client in a buffer;
the LAN side buffer managing means performing management and notification for data transmitted and received on the LAN side in the buffer;
the communication continuing means executing processing for connection/reconnection to said client and acknowledgement for sending data packets, and performing retransmission control and sequence control for application data when a line is disconnected;
the data update monitoring means monitoring whether data which has not been transmitted is new or old based on update information transmitted from said application server; and
the control unit controlling the system with a control program.

13. The server system for performing a method of updating accumulated data at a client with middleware in a data communication system according to claim 12, further including a recording medium which has a control program recorded for updating the accumulated data with the middleware of said gateway server.

14. A recording medium having a control program recorded for updating accumulated data at a client with middleware of a gateway server, said program being for executing the following procedures:
a procedure of receiving specified data from an application server in response to a data request from said client connected, holding the specified data in a buffer, adding a predetermined header to the specified data, and transmitting the specified data to said client;
a procedure of checking the presence or absence of update in the specified data in said application server when said client has not been able to receive all of the specified data and said client requests reconnection to said gateway server;
a procedure of retransmitting the specified data held in the buffer to said client if no update is present;
a procedure of receiving updated data if any update is present, updating the specified data held in the buffer, notifying said client that the specified data has been updated, and transmitting the updated data.

* * * * *